(No Model.)  3 Sheets—Sheet 1.
O. IHLE & R. ROTHE.
POTATO PLANTER.
No. 492,021. Patented Feb. 21, 1893.
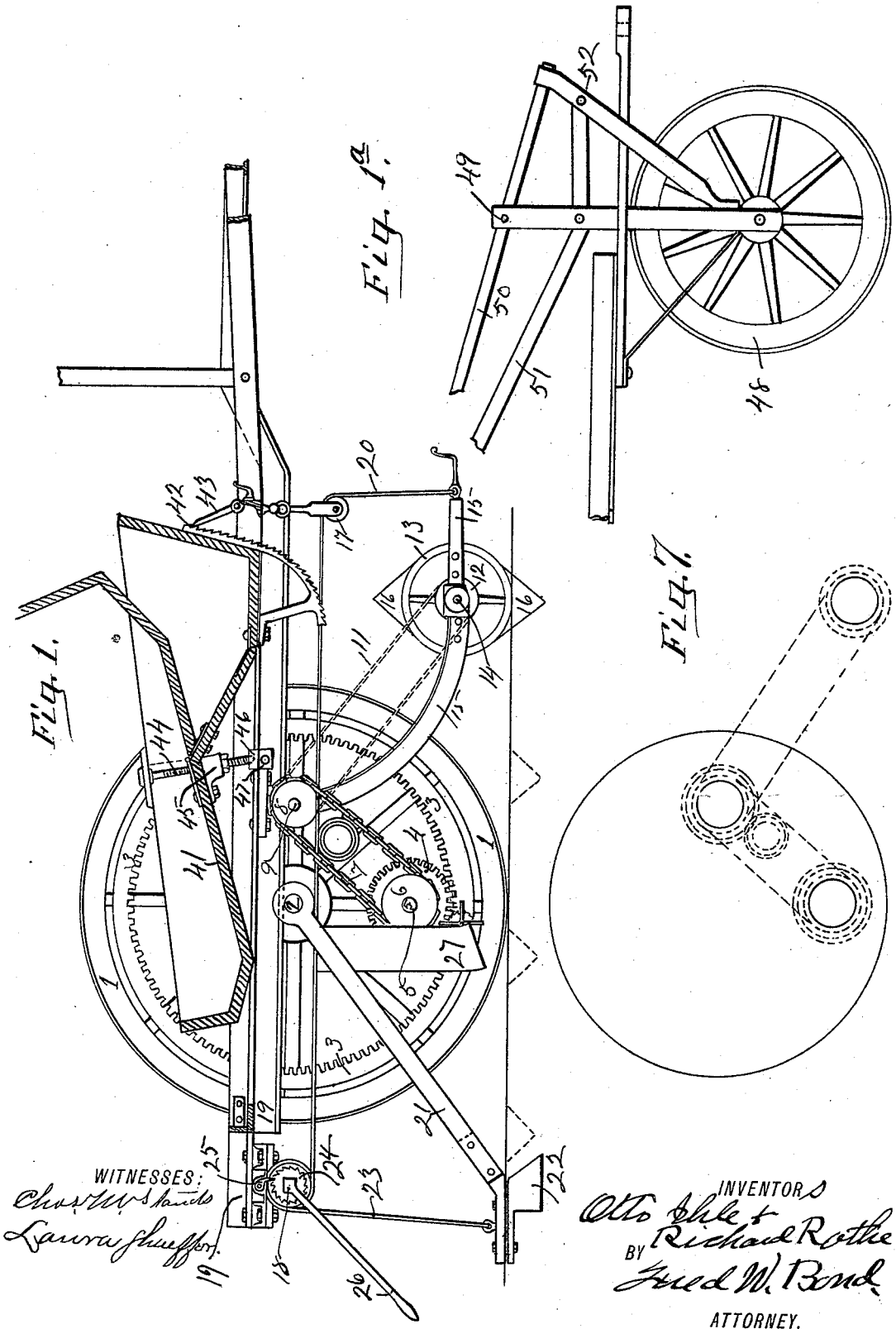
WITNESSES:
INVENTORS
Otto Ihle &
Richard Rothe
BY Fred W. Bond
ATTORNEY.

(No Model.) 3 Sheets—Sheet 2.
O. IHLE & R. ROTHE.
POTATO PLANTER.
No. 492,021. Patented Feb. 21, 1893.
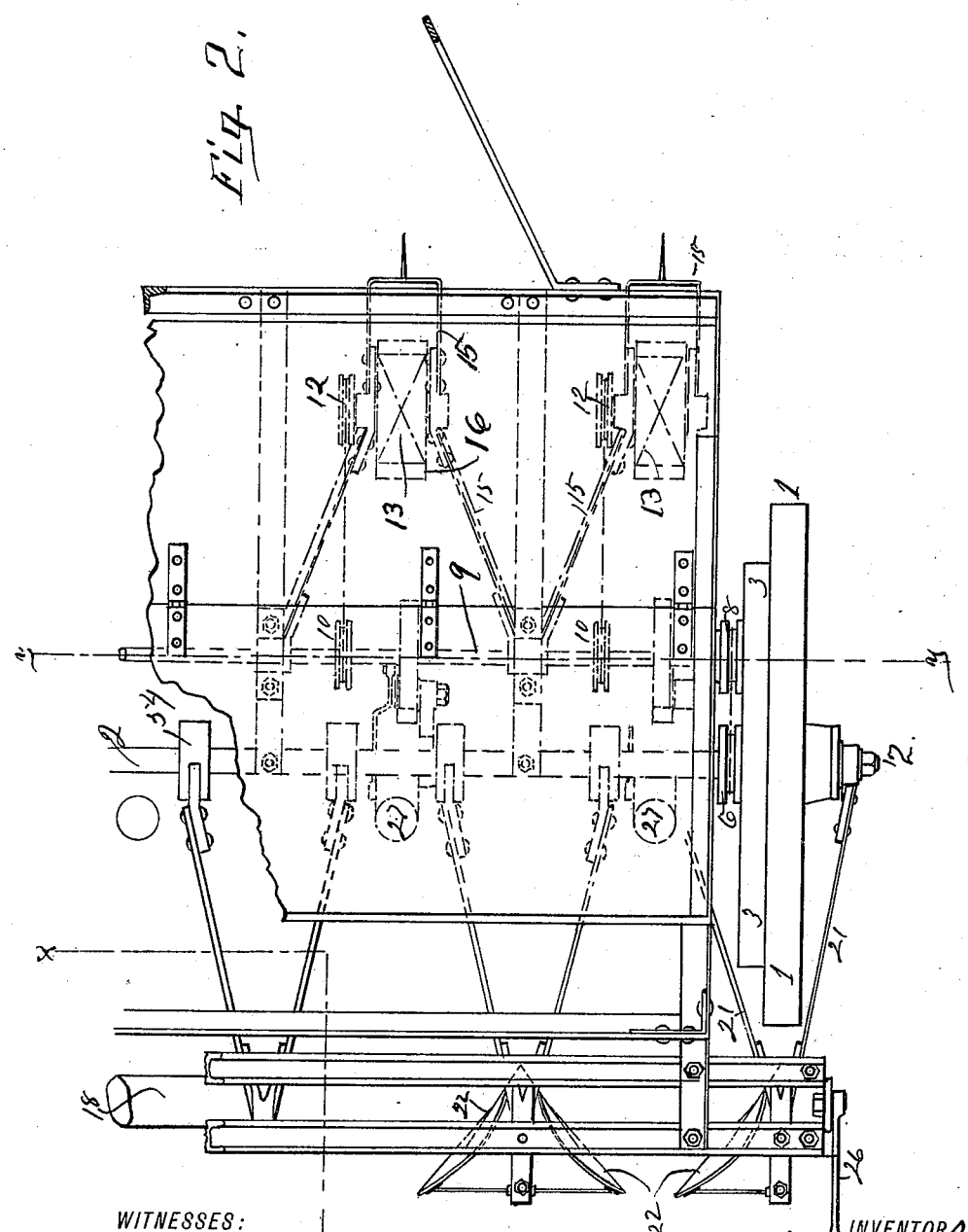

(No Model.) 3 Sheets—Sheet 3.
O. IHLE & R. ROTHE.
POTATO PLANTER.
No. 492,021. Patented Feb. 21, 1893.
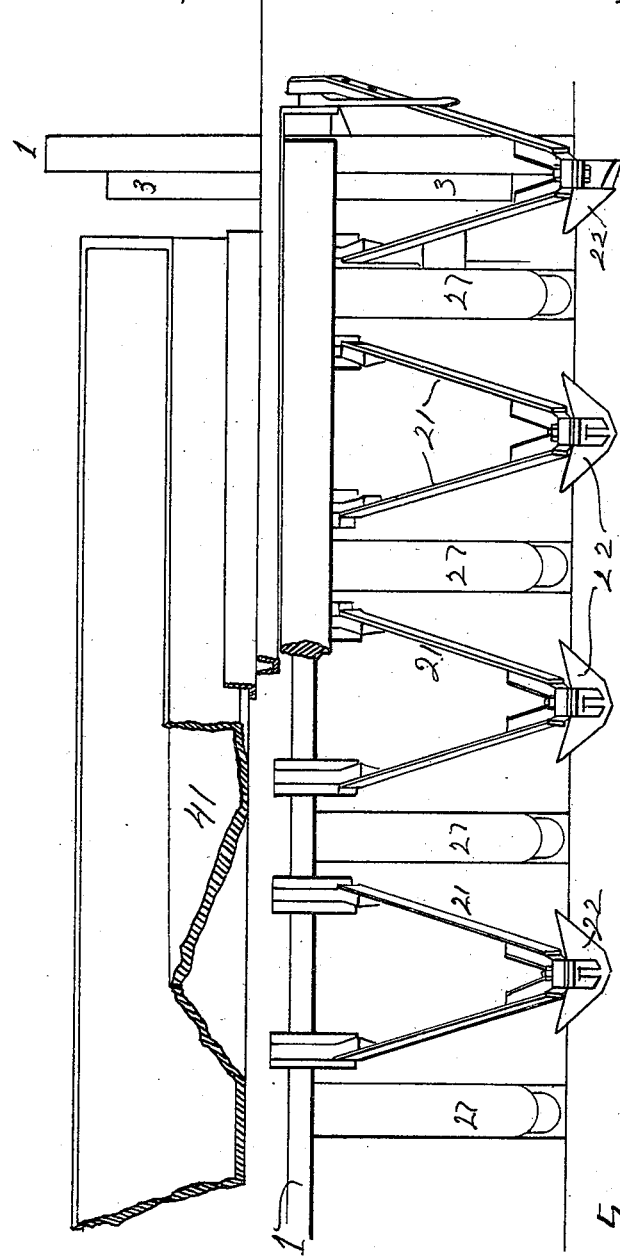
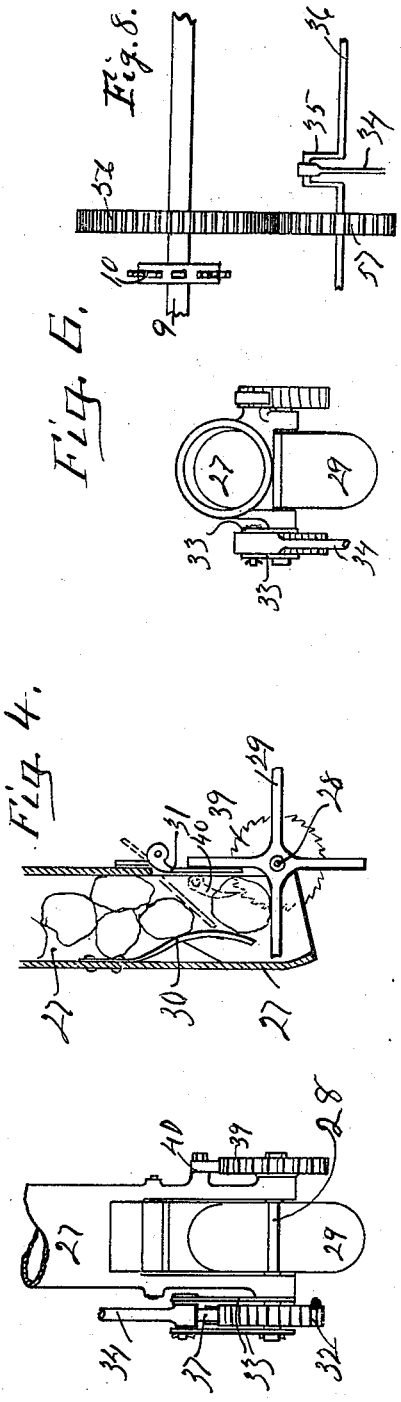
WITNESSES:
INVENTORS
ATTORNEY.

UNITED STATES PATENT OFFICE.

OTTO IHLE, OF CHEMNITZ, GERMANY, AND RICHARD ROTHE, OF CANTON, OHIO.

POTATO-PLANTER.

SPECIFICATION forming part of Letters Patent No. 492,021, dated February 21, 1893.

Application filed July 5, 1892. Serial No. 439,002. (No model.)

*To all whom it may concern:*

Be it known that we, OTTO IHLE, residing at Chemnitz, Saxony, Germany, and RICHARD ROTHE, residing at Canton, Stark county, Ohio, subjects of the Emperor of Germany, have invented certain new and useful Improvements in Potato-Planters; and we do hereby declare that the following is a full, clear, and exact description of the same, reference being had to the annexed drawings, making a part of this specification, and to the figures marked thereon, in which—

Figures 1, 1ª are longitudinal sections of the machine showing the front or forward part lowered, for the purpose of showing the location of the different parts, especially the front or forward truck. Fig. 2, is a top view with the table or hopper removed. Fig. 3, is a view showing the rear part of the planter. Fig. 4, is a longitudinal section of one of the potato-planting tubes, showing the mechanism for dropping the potato, and retaining the same in the tube. Fig. 5, is a view of the potato tube, showing the mechanism for holding and dropping the potatoes. Fig. 6, is a transverse section of the potato tube, showing one of the arms for feeding the potatoes. Fig. 7, is a skeleton view, showing the gear mechanism for rotating the potato hole-forming shaft. Fig. 8 is a view showing a portion of the shaft designed and calculated to communicate rotary motion to the shaft provided with the potato piercing blades; also showing the gear-wheels for communicating motion to the potato-dropping mechanism; the parts for supporting said parts being removed.

The present invention has relation to pototo planters; and it consists in the different parts and combination of parts hereinafter described and particularly pointed out in the claims.

Similar letters of reference indicate corresponding parts in all the figures of the drawings.

In the accompanying drawings, 1, represents the bearing journaled wheels, which are located on the sides of the potato-planter proper, and are upon the fixed shaft axle or rod 2, which shaft or rod, extends through the frame, and to which frame said shaft is securely attached.

To the rear bearing wheels 1, are attached the gear-wheels 3, which gear-wheels are preferably bolted, or otherwise attached, to the spokes of the traveling-wheels; or if desired the gear-wheels 3, may be attached to the rim of the traveling-wheels 1. The pinions 4, are so located that they will mesh with the teeth of the gear-wheels 3. The pinions 4, are mounted upon the shaft 5, which shaft is secured or properly fastened to suitable brackets, which brackets are attached in any suitable and well known manner to the frame of the planter proper.

To the side of the pinions 4, are located the sprocket-wheels 6, which sprocket-wheels are for the purpose of receiving the sprocket-chain 7, said sprocket chain leading to the sprocket wheels 8; the sprocket-wheels 8, are located upon the shaft 9, which shaft is properly journaled to the frame of the planter.

Upon the shaft 9, are located the sprocket-wheels 10, which sprocket-wheels are for the purpose of receiving the chain 11, said chain leading to the sprocket wheels 12. To the side of the sprocket-wheels 12, are located the wheels 13, which wheels are securely attached to the shaft 14, said shaft being journaled to the pivoted arms 15. The wheels 13, are provided with the potato-hole piercing blades or points 16, said blades or points are preferably formed cone-shaped, and are attached in any convenient and well known manner to the wheels 13, or if desired, said piercing-blades may be formed integral with the wheels 13. In the drawings, two piercing-blades 16 are shown located upon each of the wheels 13; but it will be understood that a greater or less number may be used if desired, reference being had to the speed of the wheels 13. The arms 15, are journaled to the shaft 9, and are bent or curved downward and forward, substantially as illustrated in Fig. 1.

For the purpose of regulating the height of the wheels 13, the free ends of the arms 15, are provided with cords or chains 20, which extend upward and over the pulley 17, and rearward, and are wrapped or wound around the shaft 18, which shaft is journaled to the rear end of the frame 19. The cord or chain 20, which is attached to the front or forward end of the free arm 15, is so adjusted that the wheel 13, can be raised or lowered as hereinafter described.

To the shaft 2, are pivotally attached the downwardly and rearwardly extending bars 21; and to the rear ends of said bars 21, are attached the shovels 22, which shovels are so adjusted, or formed that they will turn the soil over the holes formed by the blades 16.

For the purpose of regulating the depth of the shovels 22, the rear ends of the bars or arms 21, are provided with the cords or chains 23, which cords or chains extend upward, and are wrapped or wound around the shaft 18, substantially as illustrated in Fig. 1. The object and purpose of wrapping the cords or chains 20 and 23, around the same shaft are to provide a means for elevating or lowering the wheel 13, together with their blades 16, and the shovels 22, at the same time; or in other words, to provide a means for regulating the depth of the shovels 22, with reference to the depth of the holes into which the potatoes are to be dropped as hereinafter described.

For the purpose of providing a means for holding the wheel 13, together with its different parts and the shovels 22, at the desired point of adjustment, the ratchet-wheel 24 and the pawl 25, are provided.

For the purpose of rotating the shaft 18, the lever 26, is provided, which lever may be securely attached to one end of the shaft 18.

To the frame of the machine proper, are attached the potato conducting tubes 27; in Fig. 3, four of the tubes 27, are shown, and when this number of tubes are employed, the planter will plant four rows of potatoes at one time; or in other words, the number of potato-tubes are to correspond with the number of rows designed to be planted at one time. It will of course, be understood, that a less number of potato-tubes can be employed, as it will be understood that the machine can be built with one, two, three, or four potato-tubes. A greater number than four would not usually be desirable on account of the increased weight and bulk of the planter, however more may be used if found desirable. The top or upper ends of the tubes 27, should be formed somewhat flaring or funnel shaped, for the purpose of guiding the potatoes into the tube as they drop from the hopper.

The bottom or lower end of each potato tube 27, is provided with a journaled shaft 28, which shaft is provided with the wings or arms 29; said wings or arms being mounted upon the shaft 28, and revolve with the shaft.

For the purpose of holding the potatoes in the tube, except at the time when the potatoes are to be dropped, as hereinafter described, the retaining-spring 30 is provided; which retaining-spring is securely attached to the inner side of the tube 27, and is so formed that its free end will project inward or toward the center of the tube, substantially as illustrated in Fig. 4. To one side of the tube 27, is pivotally attached the gravity-gate or door 31, which gravity-gate or door is located directly above the shaft 28.

For the purpose of rotating the shaft 28, together with the arms 29, at the instant a potato is to be dropped, the ratchet-wheel 32, is provided, which ratchet-wheel is securely attached to the shaft 28. To the sides of the ratchet-wheel 32, are located the arms 33, which arms extend upward, and to the free ends thereof, is attached the pitman 34, which pitman is journaled at its opposite end to the crank 35, which crank is formed on the shaft 36.

For the purpose of causing the shaft 28, to stand still or at rest during the time the pitman 34, is moving backward, the detent or dog 37, is provided, which is preferably pivoted to the bottom or lower end of the pitman 34. The ratchets upon the ratchet-wheel 32, are so arranged that as the pitman 34, is making its backward movement, the detent or dog 37, will ride over the ratchet teeth, and when the pitman 34, makes its forward movement, the detent or dog 37, will engage the teeth upon the ratchet wheel 32, and cause said ratchet-wheel to revolve during the forward movement of the pitman 34, and at the same time revolve the arms 29.

For the purpose of preventing the shaft 28, from rotating backward, during the backward movement of the pitman 34, the ratchet-wheel 39, is provided, and is securely attached to the shaft 28, in any convenient and well known manner; and is held against backward rotation by means of the detent 40, (best seen in Fig. 4.) As the shaft 28, is rotated forward, one of the arms 29, will bear against the gravity-gate or door 31 and swing said gravity-gate or door inward as illustrated in dotted lines in Fig. 4, thereby preventing any accidental dropping of the potatoes contained in the tube 27. As the arms 29 revolve, the potato or potatoes resting upon one of the side arms will be permitted to drop, when the arm directly below the potato is rotated downward. It will be understood that as the gravity-door 31, is swung inward, the potatoes will be held up by said gravity-door until the arm 29, has passed the gravity-door, at which time the door will assume the position illustrated in Fig. 4, and permit a potato to fall upon the top or upper side of the next arm 29.

For the purpose of providing a means for holding a supply of potatoes the hopper or table 41, is provided, which is adjustably attached to the top or upper side of the frame 19; said table being provided with apertures or openings directly above the top or upper ends of the potato-tubes 27.

For the purpose of adjusting the table or hopper 41, the ratchet bar 42, is attached to the front or forward end of the table or hopper, and is bent or curved substantially as shown in Fig. 1. The teeth of the ratchet-bar engage the catch 43, which catch is pivotally attached to the frame 19, said catch being for the purpose of holding the front or forward end of the hopper in an elevated position, or at any desired point of adjustment.

For the purpose of assisting in holding the table or hopper at the desired point of adjustment, the screw threaded shaft 44 is provided, which screw threaded shaft passes through a screw threaded aperture in the block 45; which block is securely attached to the bottom or under side of the hopper 41. It will be understood that two screws, such as 44, should be employed; one located upon each side of the table or hopper 41. The bottom or lower end of the screw threaded shaft 44, is cone-shaped, and rests in the socket 46, which socket is formed in the block or bar 47, said block or bar being securely attached in any convenient and well known manner to the frame 19. The front or forward end of the machine proper, is held up by means of the wheel 48, which wheel is journaled or pivoted to the upright bars 49; which bars 49, are so adjusted to the frame that they will rock or oscillate in such a manner that the wheel 48, can be turned out of alignment with the wheel 1, thereby providing a means for guiding the potato planter.

For the purpose of assisting in guiding the potato-planter proper, the bars 50, and 51, are provided, which bars are attached to the posts or bars 49, and extend forward, and are connected to the inclined braces or arms 52; the bottom or lower end of said braces 52, being securely attached to the bottom or lower end of the bars 49, in any convenient and well known manner.

For the purpose of properly bracing the shovels 22, the rods or bars 21, are provided; one end of said rods being securely attached to the blocks 54, and the opposite ends of said blocks being attached to the shovels 22.

For the purpose of communicating rotary motion to the shaft 36, the cog-wheels 56 and 57, are provided, and are arranged substantially as shown in Fig. 9. It will be understood that in the event, short shafts are to be employed, in place of the long shaft 36, that a crank pit may be attached to one side of the gear-wheel 57, and the pitman 34, attached to the crank pin; as it is immaterial which construction is employed.

Having fully described our invention, what we claim as new, and desire to secure by Letters Patent, is—

1. In a potato-planter, the combination of a suitable frame and bearing-wheels, and means for communicating rotary motion to the wheels 13 journaled to the free ends of the arms 15, a potato-hopper, located above the frame 19 potato-tubes such as 27, located below the potato-hopper and shovels 22, located to the rear of the potato-tubes 27, substantially as and for the purpose specified.

2. The combination of the bearing-wheels 1, the potato-hole piercing wheel 13, pivoted to the free end of the arm 15, the cords or chains 20 and 23, the shaft 18, the operating-lever 26, piercing blades 16 and the shovels 22, substantially as and for the purpose specified.

3. The combination of the hopper 41, located upon the top or upper side of the frame 19, and above the potato-tubes 27, a screw threaded shaft 44, the tooth-bar 42, located upon the forward part of the hopper 41, and the retaining catch 43, substantially as and for the purpose specified.

4. In a potato-planter, the combination of the tube 27, provided with the retaining spring 30, the shaft 28, journalled to the bottom or lower portion of the tube 27 the arms 29, the gravity-bar 31, the ratchet-wheel 39 the pitman 34, the ratchet-wheel 32, the arms 33, and the detent 37, substantially as and for the purpose specified.

In testimony that we claim the above we have hereunto set our hands in the presence of two witnesses.

OTTO IHLE.
RICHARD ROTHE.

Witnesses as to Otto Ihle's signature:
 R. E. JAHN,
 E. A. FRAISSINET.

Witnesses as to Richard Rothe's signature:
 F. W. BOND,
 LAURA SHAEFFER.